United States Patent
Cho et al.

(10) Patent No.: US 6,658,044 B1
(45) Date of Patent: Dec. 2, 2003

(54) FREQUENCY HOPPING COMMUNICATION DEVICE AND FREQUENCY HOPPING METHOD

(75) Inventors: Hyung-Weon Cho, Seoul (KR); Jong-Hyeon Park, Seoul (KR); Je-Woo Kim, Sungnam (KR)

(73) Assignee: Samsung Thomson-CSF Co., Ltd., Kumi (KR)

( * ) Notice: Subject to any disclaimer, the term of this patent is extended or adjusted under 35 U.S.C. 154(b) by 701 days.

(21) Appl. No.: 09/602,201

(22) Filed: Jun. 22, 2000

(30) Foreign Application Priority Data

Jun. 23, 1999 (KR) .............................................. 99-23731

(51) Int. Cl.[7] .......................... H04B 15/00; H04K 1/00; H04L 27/30
(52) U.S. Cl. ........................................ 375/135; 375/132
(58) Field of Search ................................. 375/132, 133, 375/134, 135

(56) References Cited

U.S. PATENT DOCUMENTS

| | | | |
|---|---|---|---|
| 4,914,699 A | | 4/1990 | Dunn et al. |
| 5,166,953 A | | 11/1992 | Hershey et al. |
| 5,235,613 A | * | 8/1993 | Brown et al. ................ 375/135 |
| 5,259,030 A | | 11/1993 | Francis |
| 5,471,464 A | | 11/1995 | Ikeda |
| 5,793,795 A | | 8/1998 | Li |
| 5,812,522 A | * | 9/1998 | Lee et al. .................... 370/206 |
| 5,822,362 A | * | 10/1998 | Friedmann .................. 375/130 |
| 5,867,478 A | | 2/1999 | Baum et al. |
| 6,215,810 B1 | * | 4/2001 | Park ........................... 375/131 |

FOREIGN PATENT DOCUMENTS

GB 2335830 9/1999

* cited by examiner

Primary Examiner—Phuong Phu
(74) Attorney, Agent, or Firm—Robert E. Bushnell, Esq.

(57) ABSTRACT

A frequency hopping (FH) communication device and a frequency hopping method are provided. The frequency hopping communication device includes a first frequency hopping unit for receiving data to be transmitted, orthogonal frequency division multiplexing (OFDM) modulating the received data using the frequency of a subcarrier corresponding to a first frequency hopping code among the frequencies of a predetermined number of subcarriers, and outputting first frequency hopped data on which the data to be transmitted is loaded and a second frequency hopping unit for second frequency hopping the first frequency hopped data by mixing the first frequency hopped data with a carrier composed according to a second frequency hopping code. When jamming occurs, the frequency affected by jamming is restricted to a narrow bandwidth. Therefore, it is possible to reduce the influence of jamming and to easily restore data even though jamming occurs. Also, it is possible to improve the degree of concealment of data.

64 Claims, 9 Drawing Sheets

FREQUENCY HOPPING COMMUNICATION DEVICE AND FREQUENCY HOPPING METHOD

CLAIM OF PRIORITY

This application makes reference to, incorporates the same herein, and claims all benefits accruing under 35 U.S.C. §119 from an application for DOUBLE FREQUENCY HOPPING COMMUNICATION SYSTEM AND CONTROL METHOD THEREOF earlier filed in the Korean Industrial Property Office on the 23$^{rd}$ of June 1999 and there duly assigned Ser. No. 23731/1999.

BACKGROUND OF THE INVENTION

1. Technical Field

The present invention relates to a communication device, and more particularly, to a frequency hopping (FH) communication device for frequency hopping data to be transmitted and transmitting the data to be transmitted and a method therefor.

2. Related Art

In the sciences related to communication methods, spread-spectrum modulation is a modulation technique where the bandwidth of a modulated signal is spread far beyond the bandwidth of the modulating signal, independently of the modulating signal bandwidth. Spread-spectrum modulation is sometimes used as a method to reduce the effects of intentional jamming by another source.

One technique of implementing spread-spectrum modulation is known as frequency hopping (FH). The frequency hopping technique can involve a modulated signal being hopped in a pseudorandom manner among a set of frequencies. Frequency hopping can sometimes prevent an individual from knowing which band to jam.

I have found that performance of frequency hopping devices and methods can be less than satisfactory. Efforts have been made to improve communication devices and methods.

Exemplars of recent efforts in the art include U.S. Pat. No. 5,166,953 for a technique for Frequency-hopped Spread Spectrum Communications issued to Hershey et al., U.S. Pat. No. 4,914,699 for High Frequency Anti-jam Communication System Terminal issued to Dunn et al., U.S. Pat. No. 5,471,464 for Orthogonal Frequency Division Multiplex Demodulation Apparatus issued to Ikeda, U.S. Pat. No. 5,867,478 for Synchronous Coherent Orthogonal Frequency Division Multiplexing System, Method, Software And Device issued to Baum et al., U.S. Pat. No. 5,793,795 for Method For Correcting Errors From A Jamming Signal In A Frequency Hopped Spread Spectrum Communication System issued to Li, and U.S. Pat. No. 5,259,030 for Antijam Improvement Method And Apparatus issued to Francis.

While these recent efforts provide advantages, I note that they fail to adequately provide an improved frequency hopping communication device and method.

SUMMARY OF THE INVENTION

To solve the above problems and others, it is an object of the present invention to provide a frequency hopping (FH) communication device which is effected less by jamming.

It is a further object of the present invention to provide a frequency hopping method performed by the frequency hopping communication device.

Accordingly, to achieve the first object, there is provided a frequency hopping communication device, comprising a first frequency hopping unit for receiving data to be transmitted, orthogonal frequency division multiplexing (OFDM) modulating the received data using the frequency of a subcarrier corresponding to a first frequency hopping code among the frequencies of a predetermined number of subcarriers, and outputting first frequency hopped data on which the data to be transmitted is loaded and a second frequency hopping unit for second frequency hopping the first frequency hopped data by mixing the first frequency hopped data with a carrier composed according to a second frequency hopping code.

The first frequency hopping unit preferably comprises a first frequency hopping code generator for generating a predetermined first frequency hopping code according to specified regulations when data to be transmitted is input to the first frequency hopping unit, a first frequency hopping data storage unit for outputting data corresponding to the first frequency hopping code as first frequency hopped data, and an orthogonal frequency division multiplexing (OFDM) modulator for orthogonal-frequency-division-multiplexing modulating the first frequency hopped data using the frequency of a predetermined subcarrier and outputting the modulated data. The frequency hopping communication device preferably further comprises a guard interval inserting unit for receiving data output from the orthogonal-frequency-division-multiplexing modulator and inserting into the data a guard interval for reducing the influence of intersymbol interference (ISI) and interframe interference (IFI) between the subcarriers.

The frequency hopping communication device preferably further comprises a digital-to-analog converter for converting data output from the guard interval inserting unit into analog data and outputting the converted analog data.

The second frequency hopping unit preferably comprises a second frequency hopping code generator for generating a predetermined second frequency hopping code according to specified regulations when analog data is input to the second frequency hopping unit and a second frequency hopping data generator for composing subcarrier data of a frequency corresponding to the second frequency hopping code, mixing the composed data with the analog data output from the digital-to-analog converter, and generating second frequency hopping data.

The predetermined first frequency hopping code preferably comprises frequency information for orthogonal-frequency-division-multiplexing modulating data to be transmitted using N predetermined subcarriers, where N is a predetermined positive number.

Alternatively, the first frequency hopping unit preferably comprises a first frequency hopping data storage unit for outputting data corresponding to the first frequency hopping code as first frequency hopped data, a serial-to-parallel converter for parallel converting the first frequency hopped data into a predetermined number of data items and outputting the parallel converted data, an N-point complex inverse-fast-Fourier-transform (IFFT) converter for N-point complex inverse-fast-Fourier-transform converting parallel converted data $d_p(t)$ using the frequencies of N predetermined subcarriers, orthogonal-frequency-division-multiplexing modulating the parallel converted data $d_p(t)$, and outputting N modulated subcarriers $d_f(n)$ on which parallel converted data $d_p(t)$ are loaded, and a parallel-to-serial converter for receiving the N subcarrier data output from the N-point complex inverse-fast-Fourier-transform converter, serially converting the received data, and outputting the converted data.

The frequencies of the N predetermined subcarriers are preferably determined to be different from each other according to the first frequency hopping code used by the first frequencyhopping unit.

The N-point complex inverse-fast-Fourier-transform converter preferably outputs data $d_i(n)$ by N-point complex inverse-fast-Fourier-transform converting data to be transmitted according to $$d_i(n) = \frac{1}{N}\sum_{k=0}^{N-1} d_p(t)e^{j2\pi nk/N},$$

wherein n=1, 2, 3, . . . , and N is a predetermined positive number.

The phases of the N subcarriers are preferably orthogonal to each other. The first frequency hopping code generator preferably comprises a pseudo noise (PN) code generator for generating a pseudo noise code, an address generator for generating an address corresponding to the pseudo noise code output from the pseudo noise code generator, and a memory for outputting a first frequency hopping code corresponding to the address when the data to be transmitted is input.

To achieve the second object, there is provided a method for frequency hopping data to be transmitted and transmitting and receiving the data, comprising the steps of (a) orthogonal-frequency-division-multiplexing modulating received data to be transmitted using the frequency of a subcarrier corresponding to a predetermined first frequency hopping code among the frequencies of a predetermined number of subcarriers and outputting a first frequency hopped data on which data to be transmitted is loaded and (b) second frequency hopping the first frequency hopped data by mixing the first frequency hopped data with a subcarrier composed according to a second frequency hopping code.

To achieve these and other objects in accordance with the principles of the present invention, as embodied and broadly described, the present invention provides a communication apparatus, comprising: a first unit receiving first data, generating a first frequency hopping code, generating first frequency hopped data in dependence upon said first frequency hopping code, modulating said first frequency hopped data, outputting said modulated data, said modulating corresponding to orthogonal frequency division multiplexing modulating, said modulated data corresponding to said received first data loaded on said first frequency hopped data; and a second unit receiving input data corresponding to said modulated data, generating a second frequency hopping code, composing carrier data in dependence upon said second frequency hopping code, mixing said composed data with said input data, and outputting second frequency hopped data corresponding to said mixing of said composed data with said input data, said received first data corresponding to data to be transmitted.

To achieve these and other objects in accordance with the principles of the present invention, as embodied and broadly described, the present invention provides a frequency hopping communication apparatus, comprising: a first unit receiving first data, generating a predetermined first frequency hopping code, generating first frequency hopped data in dependence upon said first frequency hopping code, modulating said first frequency hopped data, outputting said modulated data, said modulated data corresponding to said received first data loaded on said first frequency hopped data; and a second unit receiving input data corresponding to said modulated data, generating a predetermined second frequency hopping code, composing carrier data in dependence upon said second frequency hopping code, mixing said composed data with said input data, and outputting second frequency hopped data corresponding to said mixing of said composed data with said input data, said first data received by said first unit corresponding to data to be transmitted.

To achieve these and other objects in accordance with the principles of the present invention, as embodied and broadly described, the present invention provides a method, comprising: modulating first data using a frequency of a subcarrier corresponding to a predetermined first frequency hopping code, said frequency being selected from among a plurality of frequencies of a predetermined number of subcarriers, said first data corresponding to data to be transmitted; outputting first frequency hopped data on which said first data is loaded, said first frequency hopped data on which said first data is loaded corresponding to modulated data; and second frequency hopping said first frequency hopped data by mixing said first frequency hopped data with a subcarrier composed in dependence upon a second frequency hopping code.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
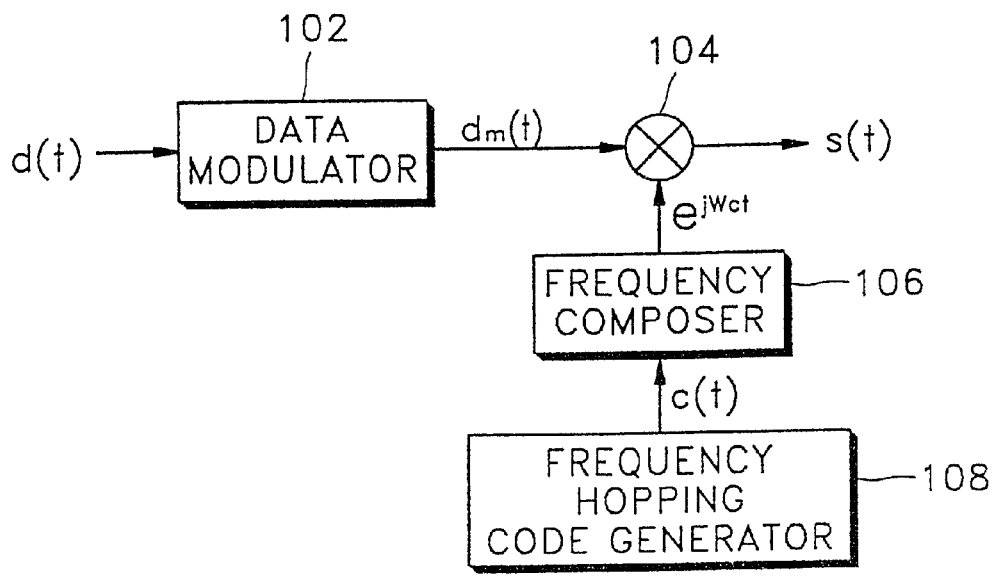
FIG. 1 is a block diagram showing the internal structure of a frequency hopping (FH) communication device.

FIG. 1 is a block diagram showing the internal structure of a double frequency hopping (FH) communication device. Referring to FIG. 1, in a transmitter, when data d(t) to be transmitted is input to a data modulator 102, the data d(t) is modulated according to a modulation method specified in the communication device, for example, a binary phase shift keying (BPSK) modulation method. Therefore, modulated data $d_m(t)$ is output as shown in Equations 1 and 2.

$$d_m(t)=K_m=K \qquad (1)$$

when, d(t)=0.

$$d_m(t)=K_m=-K \qquad (2)$$

when, d(t)=1.

A mixer 104 outputs data to be transmitted s(t) by mixing modulated data $d_m(t)$ with composite carrier data $e^{j\omega_c t}$ output from a frequency composer 106. Here, the composite carrier data $e^{j\omega_c t}$ output from the frequency composer 106 is data composed using a carrier frequency corresponding to a frequency hopping code c(t) generated by a frequency hopping code generator 108. The frequency hopping code c(t) generated by the frequency hopping code generator 104 can be considered as information on a frequency to be hopped.

$$s(t)=d_m(t)e^{j\omega_c t} \qquad (3)$$

Here, the composite carrier frequency $\omega_c$ is not a fixed frequency but a variable frequency determined corresponding to the frequency hopping code c(t) generated by the frequency hopping code generator 104.

Figure 2A:
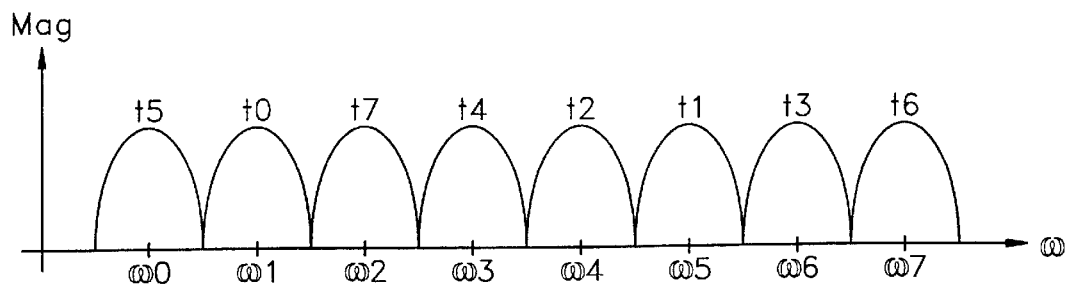
FIG. 2A shows an example of data to be transmitted, which is output from the frequency hopping communication device of FIG. 1.

FIG. 2A shows an example of data to be transmitted, which is output from the frequency hopping communication device of FIG. 1. Referring to FIG. 2A, the data to be transmitted is frequency hopped using a carrier frequency $\omega_c=\omega 1$ in a time t=t0, a carrier frequency $\omega_c=\omega 5$ in a time t=t1, a carrier frequency $\omega_c=\omega 4$ in a time t=t2, a carrier frequency $\omega_c=\omega 6$ in a time t=t3, a carrier frequency $\omega_c=\omega 0$ in a time t=t5, a carrier frequency $\omega_c=\omega 7$ in a time t=t6, and a carrier frequency $\omega_c=\omega 2$ in a time t=t7. Namely, in the frequency hopping communication device shown in FIG. 1, the carrier frequency is not fixed but variable. Accordingly, communication using this device is resistant to jamming.

Figure 2B:
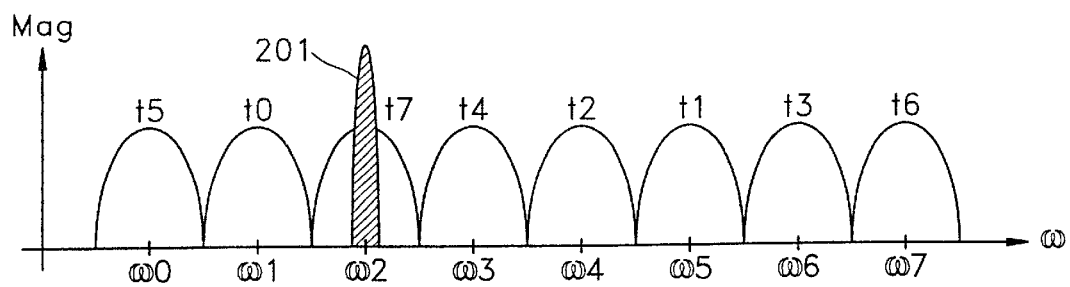
FIG. 2B shows an example of a case where errors occur in the data to be transmitted of FIG. 2A.
Figure 2C:
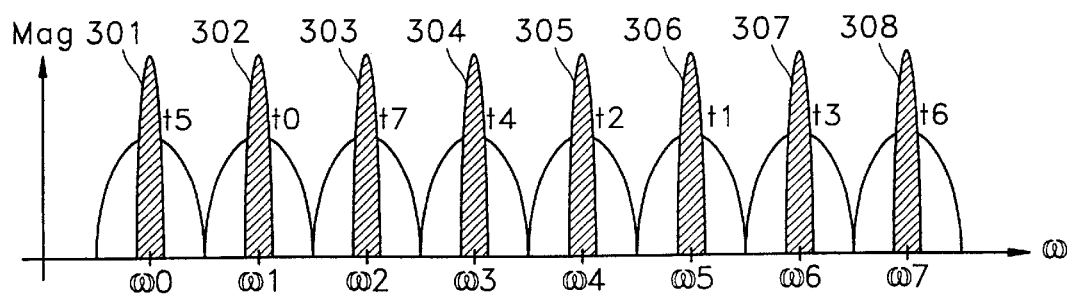
FIG. 2C shows another example of a case where errors occur in the data to be transmitted of FIG. 2A.

However, problems are caused when errors are generated in the data to be transmitted. FIG. 2B shows an example of when errors are generated in the data to be transmitted of FIG. 2A. FIG. 2C shows another example of when errors are generated in the data to be transmitted of FIG. 2A. In the frequency hopping communication device shown in FIG. 1, jamming may occur in the data to be transmitted after the frequency hopped data to be transmitted shown in FIG. 2A is transmitted to a receiving end. A case where fixed tone jamming 201 occurs is shown in FIG. 2B. A case where frequency follow tone jamming 301, 302, 303, 304, 305, 306, 307, and 308 occurs is shown in FIG. 2C. When jamming occurs as shown in FIG. 2B or 2C, it is difficult for a receiver to restore data due to jamming which exists in a corresponding carrier frequency band. Accordingly, the performance of the communication device deteriorates.

Figure 3:
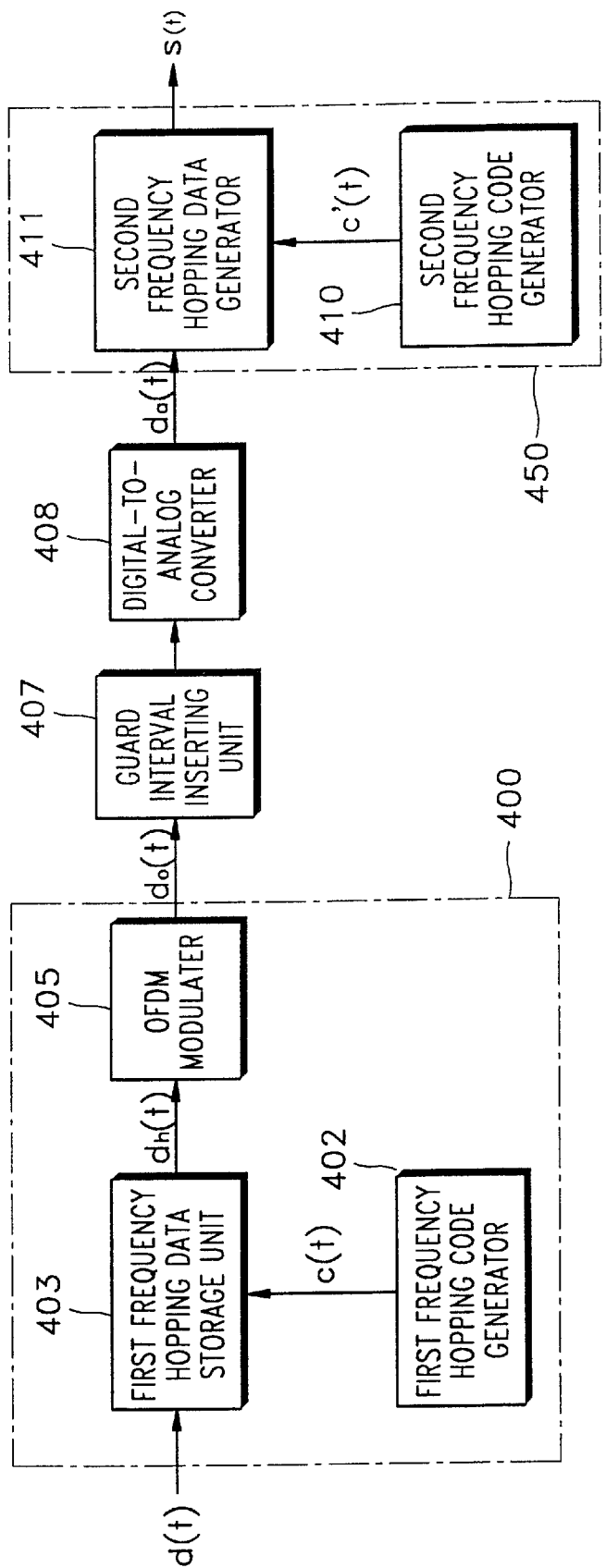
FIG. 3 shows the internal structure of a frequency hopping communication device according to an embodiment of the present invention.

FIG. 3 shows the internal structure of a frequency hopping (FH) communication device according to an embodiment of the present invention. Referring to FIG. 3, the frequency hopping communication device according to the present invention includes a first frequency hopping unit 400, a guard interval inserting unit 407, a digital-to-analog converter 408, and a second frequency hopping unit 450. Also, the first frequency hopping unit 400 includes a first frequency hopping code generator 402, a first frequency hopping data storage unit 403, and an orthogonal frequency division multiplexing (OFDM) modulator 405. Also, the second frequency hopping unit 450 includes a second frequency hopping code generator 410 and a second frequency hopping data generator 411.

The operation of the frequency hopping communication device will now be described. Data d(t) to be transmitted is input to the first frequency hopping data storage unit 403 of the first frequency hopping unit 400. The first frequency hopping code generator 402 generates a predetermined first frequency hopping code c(t) according to pre-specified regulations when the data d(t) to be transmitted is input to the first frequency hopping unit 400. The first frequency hopping data storage unit 403 stores first frequency hopped data items and outputs the first frequency hopped data corresponding to the first frequency hopping code c(t) as first frequency hopped data $d_h(t)$.

The data $d_h(t)$ output from the first frequency hopping data storage unit 403 is input to the orthogonal-frequency-division-multiplexing modulator 405. The orthogonal-frequency-division-multiplexing modulator 405 orthogonal-frequency-division-multiplexing modulates the input data $d_h(t)$ using a predetermined subcarrier and outputs modulated data $d_o(n)$. The guard interval inserting unit 407 receives the data $d_o(n)$ output from the orthogonal-frequency-division-multiplexing modulator 405 and inserts a guard interval for reducing the influence of intersymbol interference (ISI) and interframe interference (IFI) between subcarriers. The digital-to-analog converter 408 converts the data output from the guard interval inserting unit 407 into analog data and outputs the converted analog data $d_a(t)$.

The second frequency hopping code generator 410 generates a predetermined second frequency hopping code c'(t) according to the pre-specified regulations when the analog data $d_a(t)$ is input to the second frequency hopping unit 450.

The second frequency hopping data generator 411 in the second frequency hopping unit 450 composes the carrier data of the frequency corresponding to the second frequency hopping code c'(t) output from the second frequency hopping code generator 410, mixes the analog data $d_a(t)$ output from the digital-to-analog converter 408 with the composed data, and outputs second frequency hopped data to be transmitted s(t).

The frequency hopped, that is, second frequency hopped data to be transmitted s(t) can be represented as $$s(t)=d_a(t)e^{j\omega_c t} \quad (4)$$

wherein, $\omega_c$, represents each frequency corresponding to the second frequency hopping code c'(t).

Figure 4:
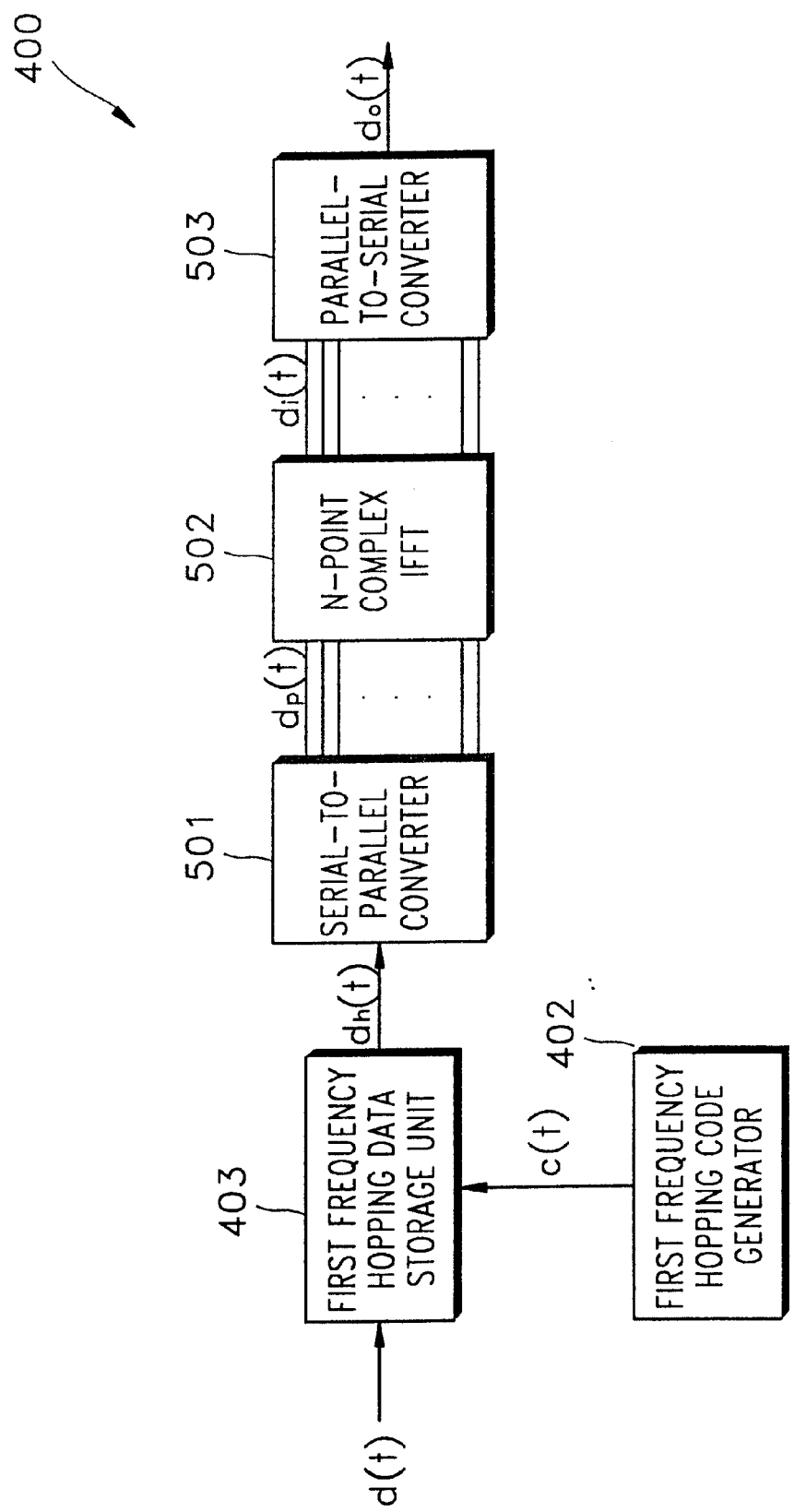
FIG. 4 is a block diagram showing an example of the internal structure of the first frequency hopping data storage unit shown in FIG. 3, in accordance with the principles of the present invention.

FIG. 4 is a block diagram showing an example of the first frequency hopping unit 400 of FIG. 3, in accordance with the principles of the present invention. Referring to FIG. 4, the data d(t) to be transmitted is input to the first frequency hopping data storage unit 403. The first frequency hopping code generator 402 generates the predetermined first frequency hopping code c(t) according to the pre-specified regulations when the data d(t) to be transmitted is input to the first frequency hopping unit 400. The predetermined first frequency hopping code c(t) preferably includes frequency information for orthogonal-frequency-division-multiplexing modulating data to be transmitted using N predetermined subcarriers, wherein N is a positive integer. The first frequency hopping data storage unit 403 outputs the first frequency hopped data corresponding to the first frequency hopping code c(t) as the first frequency hopped data $d_h(t)$.

A serial to parallel converter 501 converts the data $d_h(t)$ into parallel data $d_p(t)$ to be hopped into a predetermined number of data items and outputs the parallel converted data $d_p(t)$ to an N-point complex inverse fast Fourier transformer 502.

The N-point complex inverse fast Fourier transformer 502 performs an N-point complex inverse fast Fourier transform with respect to the parallel converted data $d_p(t)$ using the N predetermined subcarriers. Therefore, the N-point inverse fast Fourier transformer 502 outputs N modulated subcarrier data $d_i(n)$ on which the parallel converted data $d_p(t)$ are loaded. Accordingly, orthogonal-frequency-division-multiplexing modulation for the parallel converted data $d_p(t)$ is performed.

Here, the frequencies of the N predetermined subcarriers are determined to be different from each other according to the first frequency hopping code used by the first frequency hopping unit 403. Also, the phases of the N modulated subcarrier data $d_i(n)$ are orthogonal to each other. Since the orthogonal-frequency-division-multiplexing modulation is well known to those skilled in the art, description thereon will be omitted.

The data $d_i(n)$ output from the N-point complex inverse-fast-Fourier-transform converter 502 are represented by Equation 5.

$$d_i(n) = \frac{1}{N}\sum_{k=0}^{N-1} d_p(t)e^{j2\pi nk/N} \quad (5)$$

Here, n=1, 2, 3, . . . , and N.

A parallel to serial converter 503 receives the N modulated subcarrier data $d_i(n)$ output from the N-point complex inverse-fast-Fourier-transform converter 502, serially converts the received N subcarrier data $d_i(n)$ to serial form of data, and outputs serial converted data $d_o(n)$.

Figure 5:
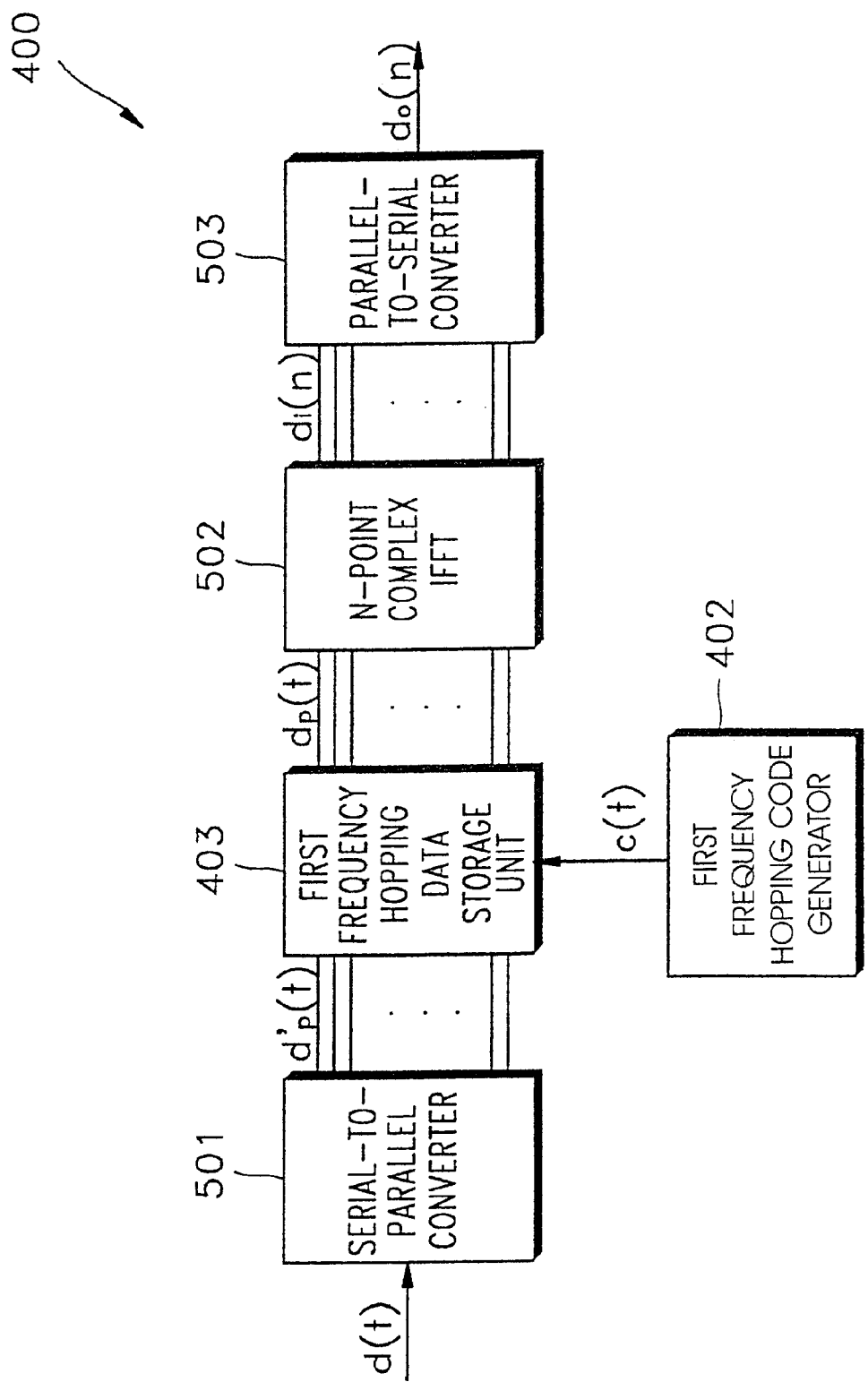
FIG. 5 is a block diagram showing another example of the internal structure of the first frequency hopping data storage unit shown in FIG. 3, in accordance with the principles of the present invention.

The first frequency hopping unit 400 of FIG. 3 can be alternatively formed as shown in FIG. 5, in accordance with the principles of the present invention. Referring to FIG. 5, the serial to parallel converter 501 receives the data d(t) to be transmitted to a transmitting end, converts the data d(t) into a predetermined number of parallel data, and outputs parallel converted data $d'_p(t)$.

The first frequency hopping code generator 402 generates the predetermined first frequency hopping code c(t) according to the pre-specified regulations when the parallel converted data $d'_p(t)$ are input to the first frequency hopping data storage unit 403. The predetermined frequency hopping code c(t) preferably includes the frequency information for orthogonal-frequency-division-multiplexing modulating the parallel converted data $d'_p(t)$ using the N subcarriers. The first frequency hopping data storage unit 403 inputs the parallel converted data $d'_p(t)$ and outputs data $d_p(t)$ corresponding to the first frequency hopping code c(t) as first frequency hopped data.

The N-point complex inverse-fast-Fourier-transform converter 502 performs an N-point complex inverse fast Fourier transform with respect to the first frequency hopped data $d_p(t)$ using the frequencies of the N subcarriers. As a result, orthogonal-frequency-division-multiplexing modulation for the data $d_p(t)$ is performed. Therefore, the N-point complex inverse fast Fourier transformer 502 outputs the N modulated subcarriers $d_i(n)$ on which the data $d_p(t)$ are loaded. Here, the frequencies of the N predetermined subcarriers are determined to be different from each other according to the first frequency hopping code used by the first frequency hopping data storage unit 403. Also, the phases of the N subcarriers $d_i(n)$ are orthogonal to each other.

The parallel to serial converter 503 receives the N subcarrier data $d_i(n)$ output from the N-point complex inverse fast Fourier transformer 502, converts the received N subcarrier data $d_i(n)$ to serial form of data, and outputs the converted data $d_o(n)$.

Figure 6A:
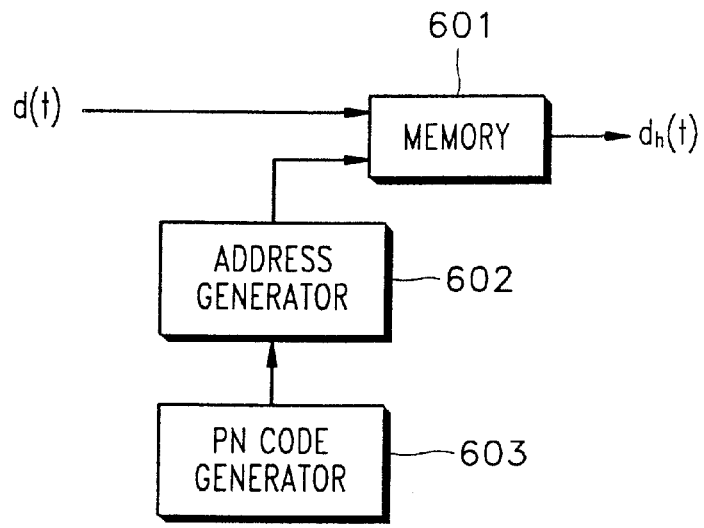
FIG. 6A is a block diagram showing an example of realizing the first frequency hopping code generator and the first frequency hopping data storage unit, which are shown in FIG. 3, in accordance with the principles of the present invention.

FIG. 6A is a block diagram showing an example of realizing the first frequency hopping code generator 402 and the first frequency hopping data storage unit 403, which are shown in FIG. 3, in accordance with the principles of the present invention. Referring to FIG. 6A, a pseudo noise (PN) code generator 603 generates a pseudo noise code and outputs the generated pseudo noise code to an address generator 602. The address generator 602 generates an address corresponding to the pseudo noise code output from the pseudo noise code generator 603 and outputs the generated address to a memory 601. First frequency hopping data items are written in the memory 601 using the address. Accordingly, the first frequency hopping data items are pseudo-randomly stored in the memory 601.

The pseudo-randomly stored first frequency hopping data items are sequentially read from the memory 601 and are output as the first frequency hopped data $d_h(t)$.

The orthogonal-frequency-division-multiplexing modulator 405 of FIG. 3 separates the data to be transmitted d(t) and the first frequency hopping code c(t) from the data $d_h(t)$ to be hopped, frequency hops data to be transmitted in the order of f2, f7, f4, f6, f1, f3, f5, and f0, which are N frequencies corresponding to the first frequency hopping code c(t), when N is 8, and outputs N modulated subcarriers $d_o(n)$.

Figure 6B:
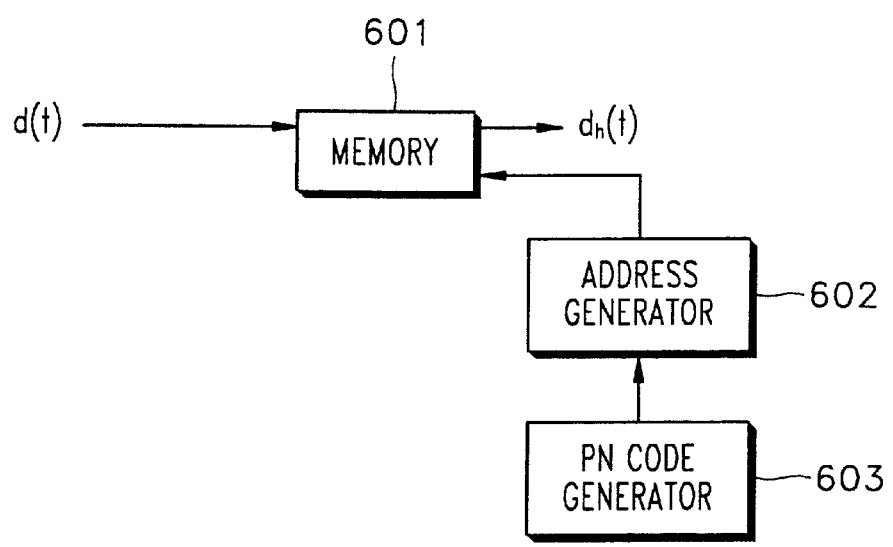
FIG. 6B is a block diagram showing another example of realizing the first frequency hopping code generator and the first frequency hopping data storage unit, which are shown in FIG. 3, in accordance with the principles of the present invention.
Figure 7A:
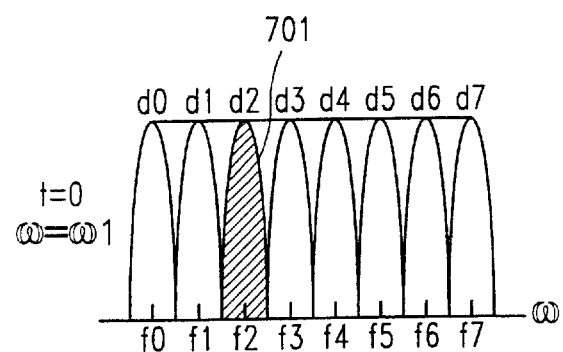
FIGS. 7A through 7H explain a subcarrier used for first frequency hopping data to be transmitted by the frequency hopping communication device, in accordance with the principles of the present invention.
Figure 7B:
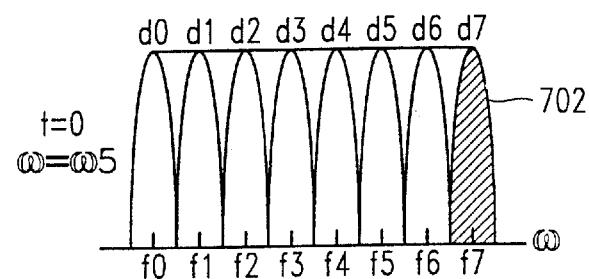
Figure 7C:
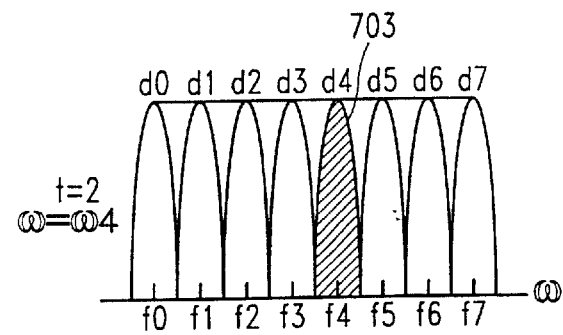
Figure 7D:
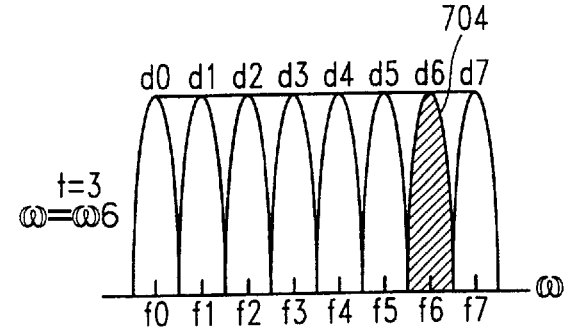
Figure 7E:
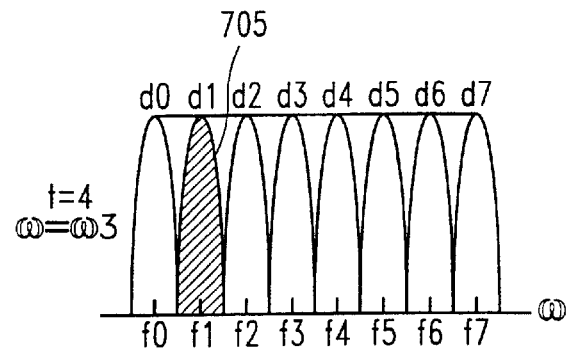
Figure 7F:
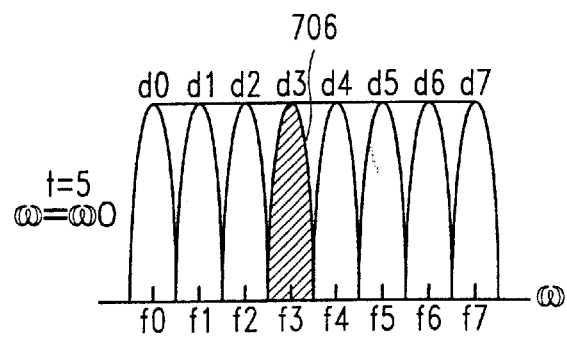
Figure 7G:
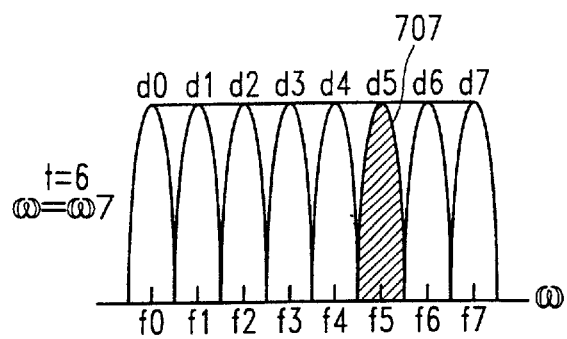
Figure 7H:
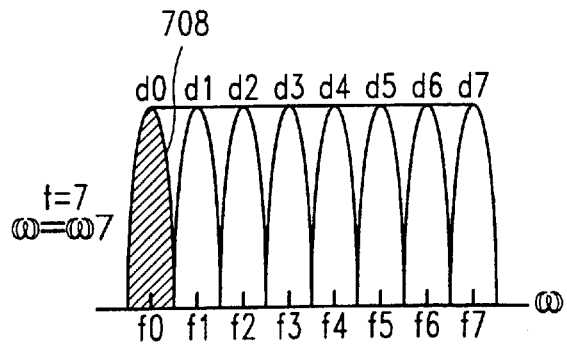

FIG. 6B is a block diagram showing another example of realizing the first frequency hopping code generator 402 and the first frequency hopping data storage unit 403, which are shown in FIG. 3, in accordance with the principles of the present invention. Referring to FIG. 6B, first frequency hopping codes are written, while sequentially increasing addresses in the memory 601. Then, the pseudo noise code generator 603 generates the pseudo noise code for frequency hopping data to be transmitted and outputs the pseudo noise code to the address generator 602 when the first frequency hopping codes are read. The address generator 602 generates an address corresponding to the pseudo noise code output from the pseudo noise code generator 603 and outputs the generated address to the memory 601. The memory 601 outputs the data stored in a place corresponding to the address as the first frequency hopped data $d_h(t)$.

The orthogonal-frequency-division-multiplexing modulator 405 of FIG. 3 separates the data to be transmitted d(t) and the first frequency hopping code c(t) from the data $d_h(t)$ to be hopped, orthogonal-frequency-division-multiplexing modulates data to be transmitted using the frequency of the subcarrier corresponding to the first frequency hopping code c(t) as described with reference to FIG. 6A, and outputs N modulated subcarriers $d_o(n)$ as described with reference to FIG. 6A.

The data to be transmitted is first input to the first frequency hopping data generator shown in FIG. 6B. The first frequency hopping data generator can obtain the first frequency hopping code according to the address generated after the data is input.

In order to promote understanding of the present invention, FIGS. 7A through 7H describe the subcarriers used for the first frequency hopping in the frequency hopping communication device according to the present invention in detail.

Referring to FIGS. 7A through 7H, first frequency hopped data are shown in the case where data to be transmitted is orthogonal-frequency-division-multiplexing modulated using the subcarriers obtained by dividing one symbol by a predetermined number, for example, 8. Namely, one symbol is 8-point complex inverse-fast-Fourier-transform converted. Here, the first frequency hopped data shown in FIGS. 7A through 7H are obtained by frequency hopping the data d(t) to be transmitted for a time from t0 to t7. Also, the first frequency hopped data shown in FIGS. 7A through 7H are the data $d_o(n)$ output from the first frequency hopping unit 400 of FIG. 3. The data $d_o(n)$ are the data orthogonal-frequency-division-multiplexing modulated using the 8 subcarriers.

Referring to FIGS. 7A through 7H, a spectrum component denoted by 701 corresponds to the spectrum component orthogonal-frequency-division-multiplexing modulated using a subcarrier frequency of $\omega_c=f2$ in a time t=t0. A spectrum component denoted by 702 corresponds to the spectrum component orthogonal-frequency-division-multiplexing modulated using a subcarrier frequency of $\omega_c=f7$ in a time t=t1. A spectrum component denoted by 703 corresponds to the spectrum component orthogonal-frequency-division-multiplexing modulated using a subcarrier frequency of $\omega_c=f4$ in a time t=t2. A spectrum component denoted by 704 corresponds to the spectrum component orthogonal-frequency-division-multiplexing modulated using a subcarrier frequency of $\omega_c=f6$ in a time t=t3. A spectrum component denoted by 705 corresponds to the spectrum component orthogonal-frequency-division-multiplexing modulated using a subcarrier frequency of $\omega_c=f1$ in a time t=t4. A spectrum component denoted by 706 corresponds to the spectrum component orthogonal-frequency-division-multiplexing modulated using a subcarrier frequency of $\omega_c=f3$ in a time t=t5. A spectrum component denoted by 707 corresponds to the spectrum component orthogonal-frequency-division-multiplexing modulated using a subcarrier frequency of $\omega_c=f5$ in a time t=t6. A spectrum component denoted by 708 corresponds to the spectrum component orthogonal-frequency-division-multiplexing modulated using a subcarrier frequency of $\omega_c=f0$ in a time t=t7.

The first frequency hopping is completed by orthogonal-frequency-division-multiplexing modulating data to be transmitted using the predetermined number of subcarriers.

Figure 8:
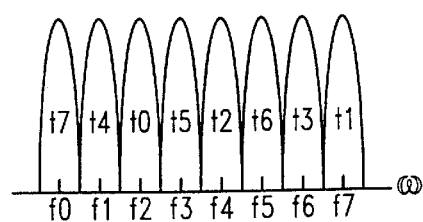
FIG. 8 shows the result of first frequency hopping data to be transmitted using the subcarrier wave explained with reference to FIGS. 7A through 7H, in accordance with the principles of the present invention.

FIG. 8 shows the spectrums of the first frequency hopped data using the predetermined number of subcarriers as described with reference to FIGS. 7A through 7H, in accordance with the principles of the present invention. Referring to FIG. 8, the subcarrier components are modulated for the time from t0 to t7 in the spectrums of the first frequency hopped data.

Figure 9:
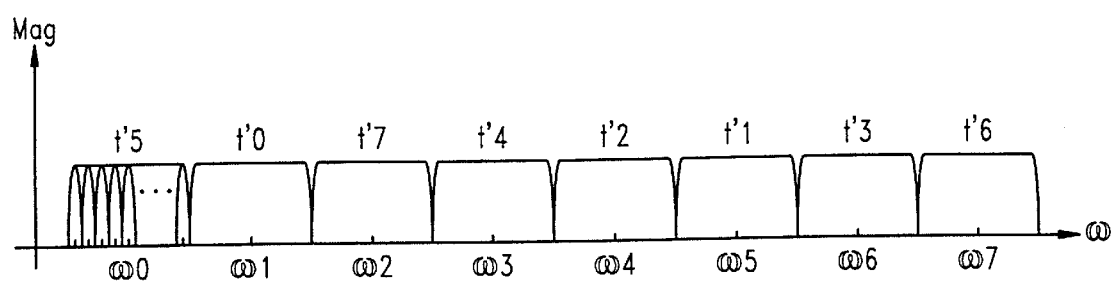
FIG. 9 shows an example of data which has been frequency hopped by the frequency hopping communication device, in accordance with the principles of the present invention.

The data first frequency hopped using the predetermined number of, for example, 8, subcarrier frequencies as shown in FIG. 8 are second frequency hopped through the second frequency hopping unit 450 shown in FIG. 3. FIG. 9 shows an example of the data frequency hopped by the frequency hopping communication device, in accordance with the principles of the present invention. Referring to FIG. 9, the data is second hopped using the frequency $\omega_c=\omega1$ in the time t=t0, the frequency $\omega_c=\omega5$ in the time t'=t1, the frequency $\omega_c=\omega4$ in the time t'=t2, the frequency $\omega_c=\omega6$ in the time t'=t3, the frequency $\omega_c=\omega3$ in the time t=t4, the frequency $\omega_c=\omega0$ in the time t'=t5, the frequency $\omega_c=\omega7$ in the time t'=t6, and the frequency $\omega_c=\omega2$ in the time t'=t7.

The frequency hopping communication device orthogonal-frequency-division-multiplexing demodulates the data to be transmitted by the first frequency hopping unit, generates the plurality of modulated subcarriers on which the data to be transmitted is loaded, performs first frequency hopping for the plurality of subcarriers and second frequency hopping for the plurality of subcarriers, and transmits the plurality of subcarriers.

In the second frequency hopped data, the frequency affected by jamming is restricted to a narrow bandwidth. Therefore, it is possible to reduce the influence of jamming and to easily restore data when jamming occurs. Also, the degree of concealment of the second frequency hopped data is high since the data is divided into the subcarriers of the frequencies determined according to predetermined regulations.

According to the present invention, since the frequency affected by jamming is restricted to the narrow bandwidth, it is possible to reduce the influence of jamming and to easily restore data when jamming occurs. Also, it is possible to improve the degree of concealment of data.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A communication apparatus, comprising:
   a first unit receiving first data, generating a first frequency hopping code, generating first frequency hopped data in dependence upon said first frequency hopping code, modulating said first frequency hopped data, outputting said modulated data, said modulating corresponding to orthogonal frequency division multiplexing modulating, said modulated data corresponding to said received first data loaded on said first frequency hopped data; and a second unit receiving input data corresponding to said modulated data, generating a second frequency hopping code, composing carrier data in dependence upon said second frequency hopping code, mixing said composed data with said input data, and outputting second frequency hopped data corresponding to said mixing of said composed data with said input data, said received first data corresponding to data to be transmitted.

2. The apparatus of claim 1, said first frequency hopping code being generated when said first data is received by said first unit, said second frequency hopping code being generated when said input data is received by said second unit.

3. The apparatus of claim 1, said first frequency hopping code corresponding to a predetermined first frequency hopping code, said second frequency hopping code corresponding to a predetermined second frequency hopping code.

4. The apparatus of claim 1, said first frequency hopping code being generated in accordance with first predetermined regulations, said second frequency hopping code being generated in accordance with second predetermined regulations.

5. The apparatus of claim 1, said first frequency hopping code being generated in accordance with first predetermined regulations when said first data is received by said first unit, said second frequency hopping code being generated in accordance with second predetermined regulations when said input data is received by said second unit.

6. The apparatus of claim 1, said first frequency hopping code being generated in accordance with first predetermined regulations when said first data is received by said first unit, said first frequency hopping code corresponding to a predetermined first frequency hopping code, said second frequency hopping code being generated in accordance with second predetermined regulations when said input data is received by said second unit, said second frequency hopping code corresponding to a predetermined second frequency hopping code.

7. The apparatus of claim 1, said modulating of said first frequency hopped data using a frequency of a predetermined subcarrier.

8. The apparatus of claim 1, said modulating of said first frequency hopped data using a frequency of a subcarrier corresponding to said first frequency hopping code among frequencies of a predetermined quantity of subcarriers.

9. The apparatus of claim 1, said apparatus corresponding to a frequency hopping communication device frequency hopping data.

10. The apparatus of claim 1, said first unit corresponding to a first frequency hopping unit, said second unit corresponding to a second frequency hopping unit.

11. The apparatus of claim 1, said first unit generating said first frequency hopped data in dependence upon said received first data and said first frequency hopping code.

12. The apparatus of claim 1, said first unit comprising:
a first frequency hopping code generator performing said generating of said first frequency hopping code according to predetermined regulations when said first data is received by said first unit;
a first frequency hopping data storage unit performing said generating of said first frequency hopped data; and
an orthogonal-frequency-division-multiplexing modulator performing said modulating of said first frequency hopped data using a frequency of a predetermined subcarrier, and performing said outputting of said modulated data.

13. The apparatus of claim 12, said first frequency hopping code corresponding to a predetermined first frequency hopping code.

14. The apparatus of claim 12, said predetermined subcarrier being among a predetermined quantity of subcarriers.

15. The apparatus of claim 14, further comprising:
a guard interval inserting unit receiving said modulated data output from said modulator, inserting a guard interval into said modulated data, said guard interval reducing influence of intersymbol interference and interframe interference between said predetermined quantity of subcarriers.

16. The apparatus of claim 15, further comprising:
a digital-to-analog converter converting data output from said guard interval inserting unit into analog data, and outputting said converted analog data.

17. The apparatus of claim 16, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data, said received input data corresponding to said analog data output from said the digital-to-analog converter.

18. The apparatus of claim 15, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data.

19. The apparatus of claim 12, further comprising:
a digital-to-analog converter converting said modulated data output from said first unit into analog data, and outputting said converted analog data.

20. The apparatus of claim 19, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data, said received input data corresponding to said analog data output from said the digital-to-analog converter.

21. The apparatus of claim 12, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data.

22. The apparatus of claim 1, said first unit performing said modulating of said first frequency hopped data using a frequency of a predetermined subcarrier, said predetermined subcarrier being among a predetermined quantity of subcarriers.

23. The apparatus of claim 22, further comprising:
a guard interval inserting unit receiving said modulated data output from said first unit, inserting a guard interval into said modulated data, said guard interval reducing influence of intersymbol interference and interframe interference between said predetermined quantity of subcarriers.

24. The apparatus of claim 23, further comprising:
a digital-to-analog converter converting data output from said guard interval inserting unit into analog data, and outputting said converted analog data.

25. The apparatus of claim 24, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data, said received input data corresponding to said analog data output from said the digital-to-analog converter.

26. The apparatus of claim 25, said second frequency hopping code corresponding to a predetermined second frequency hopping code.

27. The apparatus of claim 23, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data.

28. The apparatus of claim 27, said second frequency hopping code corresponding to a predetermined second frequency hopping code.

29. The apparatus of claim 1, further comprising:
a digital-to-analog converter converting said modulated data output from said first unit into analog data, and outputting said converted analog data.

30. The apparatus of claim 29, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data, said received input data corresponding to said analog data output from said the digital-to-analog converter.

31. The apparatus of claim 1, said second unit comprising:
a second frequency hopping code generator performing said generating of said second frequency hopping code according to predetermined regulations when said input data is received by said second unit; and
a second frequency hopping data generator performing said composing of said carrier data, performing said mixing of said composed data with said received input data, and generating said second frequency hopped data.

32. The apparatus of claim 31, said second frequency hopping code corresponding to a predetermined second frequency hopping code.

33. A frequency hopping communication apparatus, comprising:
a first unit receiving first data, generating a predetermined first frequency hopping code, generating first frequency hopped data in dependence upon said first frequency hopping code, modulating said first frequency hopped data, outputting said modulated data, said modulated data corresponding to said received first data loaded on said first frequency hopped data; and
a second unit receiving input data corresponding to said modulated data, generating a predetermined second frequency hopping code, composing carrier data in dependence upon said second frequency hopping code, mixing said composed data with said input data, and outputting second frequency hopped data corresponding to said mixing of said composed data with said input data, said first data received by said first unit corresponding to data to be transmitted.

34. The apparatus of claim 33, said modulating corresponding to orthogonal frequency division multiplexing modulating.

35. The apparatus of claim 34, said first frequency hopping code comprising:
frequency information for orthogonal-frequency-division-multiplexing modulating said received first data using N predetermined subcarriers, where N is a predetermined positive number.

36. The apparatus of claim 35, said first unit comprising:
a first frequency hopping data storage unit outputting said first frequency hopped data;
a first converter first converting said first frequency hopped data into a determined number of data items, and outputting said first converted data, said first converter corresponding to a serial-to-parallel converter, said first converting corresponding to parallel converting, said first converted data corresponding to parallel converted data, said first converted data corresponding to $d_p(t)$;
a second converter second converting said first converted data using frequencies of said N predetermined subcarriers, orthogonal-frequency-division-multiplexing modulating said first converted data, and outputting said first converted data loaded on N modulated subcarriers, said second converter corresponding to an N-point complex inverse-fast-Fourier-transform converter, said second converting corresponding to N-point complex inverse-fast-Fourier-transform converting, said N modulated subcarriers corresponding to $d_t(n)$; and
a third converter receiving said N subcarrier data output from said second converter, third converting said received N subcarrier data, and outputting said third converted data, said third converter corresponding to a parallel-to-serial converter, said third converting corresponding to serially converting.

37. The apparatus of claim 36, said frequencies of said N predetermined subcarriers being determined to be different from each other according to said first frequency hopping code used by said first unit.

38. The apparatus of claim 37, said second converter outputting said second converted data by N-point complex inverse-fast-Fourier-transform converting said first converted data in accordance with $$d_i(n) = \frac{1}{N}\sum_{k=0}^{N-1} d_p(t)e^{j2\pi nk/N},$$

wherein n=1, 2, 3, . . . , and $d_p(t)$ corresponding to said parallel converted data, and $d_i(n)$ corresponding to said N modulated subcarriers outputted.

39. The apparatus of claim 38, said N subcarriers having phases being orthogonal to each other.

40. The apparatus of claim 33, said first unit comprising:
a first converter receiving said first data, first converting said received first data into a predetermined number of data items, and outputting said first converted data, said first converter corresponding to a serial-to-parallel converter, said first converting corresponding to parallel converting;
a first frequency hopping data storage unit receiving said first converted data, and outputting said first frequency hopped data;
a first frequency hopping code generator generating said predetermined first frequency hopping code in accordance with specified regulations when said first converted data are input to said first frequency hopping data storage unit;
a second converter orthogonal-frequency-division-multiplexing modulating said first frequency hopping data using frequencies of N predetermined subcarriers and outputting N modulated subcarriers on which said first converted data are loaded, said second converter corresponding to an N-point complex inverse-fast-Fourier-transform converter; and
a third converter receiving said N subcarrier data output from said second converter, third converting said received N subcarrier data, and outputting said third converted data, said third converter corresponding to a parallel-to-serial converter, said third converting corresponding to serially converting.

41. The apparatus of claim 40, said frequencies of said N subcarriers being determined to be different in accordance with said first frequency hopping code used by said first unit.

42. The apparatus of claim 40, said second converter outputting said second converted data by N-point complex inverse-fast-Fourier-transform converting said first converted data in accordance with $$d_i(n) = \frac{1}{N}\sum_{k=0}^{N-1} d_p(t)e^{j2\pi nk/N},$$

wherein n=1, 2, 3, . . . , and $d_p(t)$ corresponding to said first converted data, and $d_i(n)$ correspoding to said N modulated subcarriers outputted.

43. The apparatus of claim 40, said first frequency hopping code generator comprising:
a pseudo noise code generator generating a pseudo noise code for said frequency hopped data to be transmitted, outputting said pseudo noise code;
an address generator generating an address corresponding to said pseudo noise code, outputting said address; and
a memory receiving and storing said first data, outputting said first frequency hopping code corresponding to said address, said memory storing said first frequency hopping code.

44. The apparatus of claim 40, said first frequency hopping code generator comprising:
a pseudo noise code generator generating a pseudo noise code;
an address generator generating an address corresponding to said pseudo noise code; and
a memory outputting said first frequency hopping code corresponding to said address when said first data is received by said first unit.

45. The apparatus of claim 33, said first unit comprising:
a first frequency hopping code generator performing said generating of said first frequency hopping code according to predetermined regulations when said first data is received by said first unit;
a first frequency hopping data storage unit performing said generating of said first frequency hopped data; and
an orthogonal-frequency-division-multiplexing modulator performing said modulating of said first frequency hopped data using a frequency of a predetermined subcarrier, and performing said outputting of said modulated data.

46. The apparatus of claim 45, said first frequency hopping code generator comprising:
a pseudo noise code generator generating a pseudo noise code for said frequency hopping said first data, outputting said pseudo noise code;
an address generator generating an address corresponding to said pseudo noise code, outputting said address; and
a memory receiving and storing said first data, outputting said first frequency hopping code corresponding to said address, said memory storing said first frequency hopping code.

47. The apparatus of claim 45, said first frequency hopping code generator comprising:
a pseudo noise code generator generating a pseudo noise code;
an address generator generating an address corresponding to said pseudo noise code; and
a memory outputting said first frequency hopping code corresponding to said address when said first data is received by said first unit.

48. The apparatus of claim 33, said first unit comprising:
a pseudo noise code generator generating a pseudo noise code for said frequency hopped data to be transmitted, outputting said pseudo noise code;
an address generator generating an address corresponding to said pseudo noise code, outputting said address; and
a memory receiving and storing said first data, outputting said first frequency hopping code corresponding to said address, said memory storing said first frequency hopping code.

49. A method, comprising:
modulating first data using a frequency of a subcarrier corresponding to a predetermined first frequency hopping code, said frequency being selected from among a plurality of frequencies of a predetermined number of subcarriers, said first data corresponding to data to be transmitted;

outputting first frequency hopped data on which said first data is loaded, said first frequency hopped data on which said first data is loaded corresponding to modulated data; and second frequency hopping said first frequency hopped data by mixing said first frequency hopped data with a subcarrier composed in dependence upon a second frequency hopping code.

50. The method of claim 49, said modulating corresponding to orthogonal-frequency-division-multiplexing modulating.

51. The method of claim 50, said modulating further comprising:

generating said predetermined first frequency hopping code according to specified regulations when said first data is input to a first unit;

combining said first frequency hopping code with said first data, outputting second data, said second data corresponding to data to be hopped; and dividing said second data into said first data and said first frequency hopping code, orthogonal-frequency-division-multiplexing modulating said first data using said frequency of said subcarrier corresponding to said first frequency hopping code.

52. The method of claim 51, further comprising:

receiving said modulated data and inserting a guard interval into said modulated data, said guard interval reducing influence of intersymbol interference and interframe interference, said modulated data having said guard interval inserted corresponding to guard interval data, said receiving being performed after said dividing.

53. The method of claim 52, said guard interval reducing influence of intersymbol interference and interframe interference between said predetermined number of subcarriers.

54. The method of claim 52, further comprising:

converting said guard interval data into analog data, outputting said analog data, said converting being performed after said receiving.

55. The method of claim 54, said second frequency hopping further comprising:

generating a predetermined second frequency hopping code in dependence upon specified regulations when said analog data is input to a second unit;

composing said subcarrier data of a frequency corresponding to said second frequency hopping code; and mixing said analog data with said composed data, generating second frequency hopped data.

56. The method of claim 50, said predetermined first frequency hopping code including frequency information for orthogonal-frequency-division-multiplexing modulating said first data using N predetermined subcarriers when N is a predetermined positive number.

57. The method of claim 50, said modulating further comprising:

outputting second data corresponding to said first frequency hopping code, said second data corresponding to first frequency hopped data;

parallel converting said first frequency hopped data into a predetermined number of data items and outputting said parallel converted data, said parallel converted data corresponding to $d_p(t)$;

N-point complex inverse-fast-Fourier-transform converting said parallel converted data using frequencies of N predetermined subcarriers, orthogonal-frequency-division-multiplexing modulating said parallel converted data, outputting N modulated subcarriers on which said parallel converted data are loaded, said N modulated subcarriers corresponding to $d_i(n)$; and receiving said N subcarrier data output from said N-point complex inverse-fast-Fourier-transform converter, serially converting said subcarrier data, outputting said serially converted data.

58. The method of claim 57, said frequencies of said N predetermined subcarriers being determined to be different from each other according to said first frequency hopping code used by said first unit.

59. The method of claim 57, said receiving of said N subcarrier data output from said inverse-fast-Fourier-transform converter, said serially converting of said subcarrier data, said outputting of said serially converted data comprising:

obtaining said data $d_i(n)$ by N-point complex inverse-fast-Fourier-transform converting said first data according to $$d_i(n) = \frac{1}{N}\sum_{k=0}^{N-1} d_p(t)e^{j2\pi nk/N},$$

wherein n=1, 2, 3, . . . , and $d_p(t)$ corresponding to said parallel converted data, and $d_i(n)$ corresponding to said N modulated subcarriers outputted, and N being a predetermined positive number.

60. The method of claim 59, phases of said N subcarriers being orthogonal to each other.

61. The method of claim 50, said modulating further comprising:

receiving said first data, parallel converting said first data into a predetermined number of data items and outputting said parallel converted data;

generating said predetermined first frequency hopping code according to specified regulations when said parallel converted data are input to a first frequency hopping data storage unit, said parallel converted data corresponding to $d_p(t)$;

outputting first frequency hopped data, said first frequency hopped data corresponding to said first frequency hopping code;

modulating said first frequency hopped data using frequencies of N predetermined subcarriers and outputting N modulated subcarriers on which said parallel converted data is loaded, said modulating corresponding to orthogonal-frequency-division-multiplexing modulating, said N modulated subcarriers outputted corresponding to $d_i(n)$; and receiving said N modulated subcarrier data, serially converting said received subcarrier data, and outputting said serially converted data.

62. The method of claim 61, said frequencies of said N predetermined subcarriers being determined to be different from each other in dependence upon said first frequency hopping code.

63. The method of claim 62, said first frequency hopping code being used by a first frequency hopping unit.

64. The method of claim 61, said modulating of said first frequency hopped data and said outputting of said N modulated subcarriers comprising:

obtaining said data $d_i(n)$ by N-point complex inverse-fast-Fourier-transform converting said first data according to $$d_i(n) = \frac{1}{N}\sum_{k=0}^{N-1} d_p(t)e^{j2\pi nk/N},$$

wherein n=1, 2, 3, . . . , and $d_p(t)$ corresponding to said parallel converted data, and $d_i(n)$ corresponding to said N modulated subcarriers outputted, and N being a predetermined positive number.

* * * * *